United States Patent
Guey

(10) Patent No.: US 8,271,042 B2
(45) Date of Patent: Sep. 18, 2012

(54) SELF-CALIBRATING MULTI-ANTENNA WIRELESS COMMUNICATION SYSTEM

(75) Inventor: Jiann-Ching Guey, Fremont, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 142 days.

(21) Appl. No.: 12/764,189

(22) Filed: Apr. 21, 2010

(65) Prior Publication Data

US 2011/0263280 A1    Oct. 27, 2011

(51) Int. Cl.
*H04B 1/38* (2006.01)
(52) U.S. Cl. .................................... 455/561; 455/562.1
(58) Field of Classification Search ............... 455/562.1, 455/561
See application file for complete search history.

(56) References Cited

U.S. PATENT DOCUMENTS 6,037,898 A * 3/2000 Parish et al. .................. 342/174
7,392,015 B1    6/2008 Farlow et al.

* cited by examiner

*Primary Examiner* — Fayyaz Alam

(57) ABSTRACT

A large scale, self-calibrating multi-antenna wireless communication system calibrates the transmit-receive RF chains of antennas in the system. The system, during a first time interval, transmits a pilot signal from at least those antennas in a first time-reuse group, so that the pilot signals are received at antennas in one or more other time-reuse groups. The system, during a second time interval, transmits a pilot signal from at least those antennas in a second time-reuse group, so that the pilot signals are received at antennas in one or more other time-reuse groups. The system also, during a third time interval, transmits a pilot signal from at least those antennas in a third time-reuse group, so that the pilot signals are received at antennas in one or more other time-reuse groups. Based on these received pilot signals, the system calculates RF-chain calibration factors for one or more of the antennas.

6 Claims, 12 Drawing Sheets

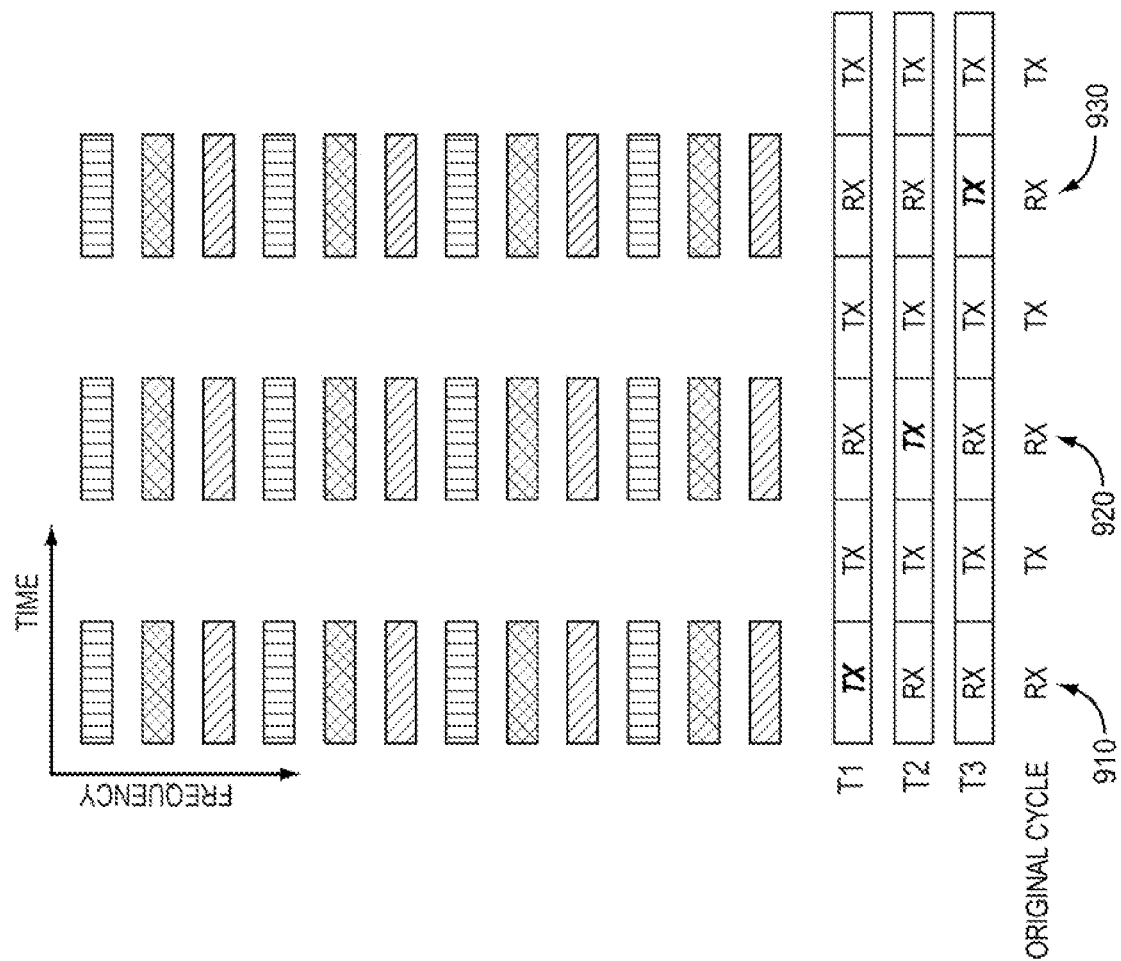

SELF-CALIBRATING MULTI-ANTENNA WIRELESS COMMUNICATION SYSTEM

TECHNICAL FIELD

The present invention relates generally to multi-antenna wireless communication systems and, more particularly, to calibrating system frequency responses for joint antenna processing in such a system.

BACKGROUND

The phenomenal growth in the demand for wireless communications has put persistent pressure on wireless network operators to improve the capacity of their communication networks. To improve the spectral efficiency of these networks, scarce radio resources have to be reused aggressively in neighboring cells. As a result, inter-cell interference has become a main source of signal disturbance, limiting not only the service quality to users at the cell edges, but also the overall system throughput.

A multi-antenna wireless communication system, such as one employing Coordinated Multipoint (CoMP) transmission and/or reception, can mitigate inter-cell interference. In such a system, multiple antennas are deployed across a plurality of geographically contiguous cells—referred to as subcells—and connected to a central controller, e.g., via a fast backhaul. This architecture enables the central controller to jointly process downlink signals transmitted from and/or uplink signals received at the multiple antennas, in order to mitigate inter-cell interference.

To jointly process downlink signals transmitted from the multiple antennas, in particular, the central controller must have available to it information characterizing the associated downlink channel responses. If the system employs frequency-division duplexing (FDD), the served mobile terminals must measure these downlink channel responses and explicitly feed them back to the central controller. If the system instead employs time-division duplexing (TDD), the downlink channel responses can advantageously be estimated from uplink signals received at the multiple antennas, based on the assumption that for TDD the downlink channel can be inferred from the uplink channel.

This assumption of reciprocity between the downlink and uplink channel, however, may sometimes be inaccurate in a multi-antenna system. For instance, each of the multiple antennas is connected to a corresponding transceiver that comprises a transmit-receive radio frequency (RF) chain. These transmit-receive RF chains may have different frequency responses, due for example to differences in the transfer characteristics of the components (e.g., analog filters, power amplifiers, etc.) making up those RF chains. If the RF chains of the multiple antennas do not have identical frequency responses, the assumption of reciprocity no longer proves accurate, which in turn prevents advantageous estimation of the downlink channel responses from uplink signals. Accordingly, the RF chains must be initially, and perhaps periodically, calibrated with one another to account for differences in their frequency responses.

Known approaches to calibrating the RF chains of antennas in a multi-antenna system rely on mobile terminals to assist with the calibration process. These approaches must identify at least one mobile terminal that is sufficiently stationary (i.e., has a relatively low Doppler spread) and that has a sufficient quality of service (i.e., a strong channel quality indicator, CQI) to adequately measure and feed back the downlink channel responses. If such a suitable mobile terminal can be identified, calibration factors can be computed based on the provided feedback and then applied to the RF chains. Of course, a suitable mobile terminal may not always be available, meaning that these approaches are inherently undependable. Further, by requiring feedback of the downlink channel responses, the approaches necessarily diminish the very advantage sought by calibrating the RF chains in the first place. Still further, these and other approaches limit the scalability of the calibration process to a relatively small number of antennas.

SUMMARY

Teachings herein include a large scale, self-calibrating multi-antenna wireless communication system for calibrating the transmit-receive RF chains of antennas in the system. The system is self-calibrating in the sense that it advantageously does not rely on mobile terminals to assist with the calibration process, and does not require feedback of downlink channel responses. Rather, the system transmits pilot signals amongst the antennas themselves, and then calculates RF-chain calibration factors for the antennas based on those received pilot signals.

In one embodiment, for example, each of a plurality of antennas in the system belongs to one of three or more time-reuse groups. The time-reuse groupings are geographically dispersed, to geographically separate all antennas belonging to the same time-reuse group. Due to this separation, pilot signals concurrently transmitted from antennas belonging to the same time-reuse group do not significantly interfere with one another.

With the system configured in this way, a calibration controller, during a first time interval, transmits a pilot signal from at least those antennas in a first time-reuse group, so that the pilot signals are received at antennas in one or more other time-reuse groups. The calibration controller further, during a second time interval, transmits a pilot signal from at least those antennas in a second time-reuse group, so that the pilot signals are received at antennas in one or more other time-reuse groups. The calibration controller also, during a third time interval, transmits a pilot signal from at least those antennas in a third time-reuse group, so that the pilot signals are received at antennas in one or more other time-reuse groups.

Based on these pilot signals received amongst the antennas, the calibration controller is configured to calculate an RF-chain calibration factor for each of one or more of the antennas. The calibration factor calculated for a given antenna accounts for a frequency response difference between the RF chain of that antenna and the RF chain of another one of the antennas, e.g., an antenna used as a reference for the calibration.

Having calculated the calibration factors in this way, the calibration controller in some embodiments adjusts the RF chain of the one or more antennas based on the corresponding calibration factors. Alternatively, the calibration controller may apply the corresponding calibration factors to a downlink data transmission being sent from those antennas, or an uplink data transmission being received at those antennas, and thereby adjust the frequency response of the data transmission rather than the transmit-receive chains themselves. In any case, the RF chains are effectively calibrated with one another to account for differences in their frequency responses.

With the RF chains calibrated, the system can accurately assume reciprocity between the downlink and uplink channels, and thereby advantageously estimate downlink channel responses from uplink signals for joint processing of multi-antenna signals.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIGS. 9A-9B illustrate time intervals of a TDD cycle during which pilot signals are transmitted amongst antennas, using different frequencies, in a self-calibrating multi-antennas wireless communication system, according to one embodiment of the present invention.

DETAILED DESCRIPTION

Figure 1:
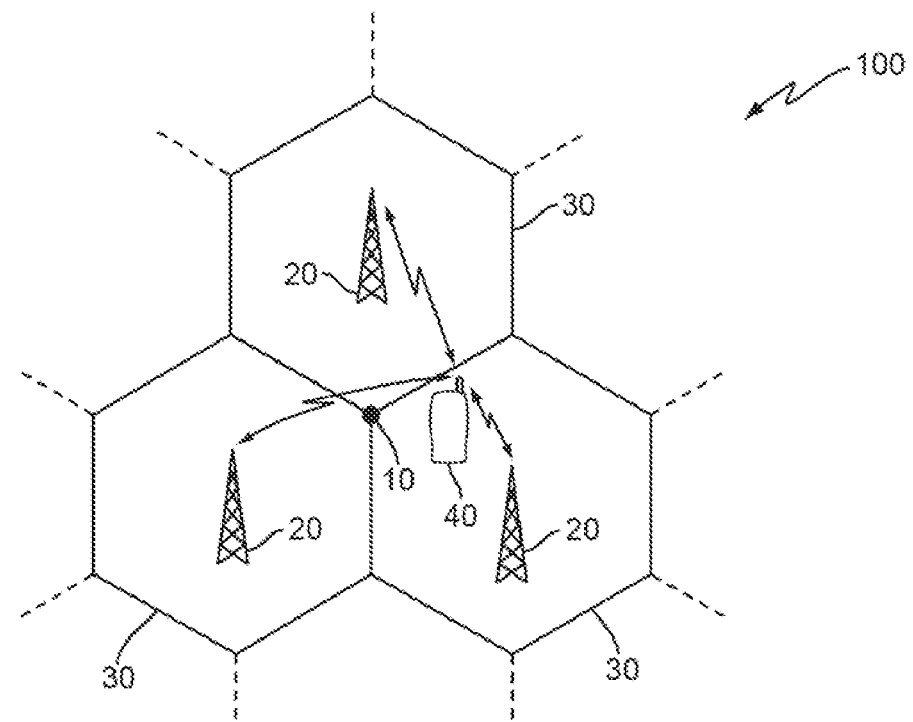
FIG. 1 illustrates a multi-antenna wireless communication system according to one embodiment of the present invention.

FIG. 1 depicts a multi-antenna wireless communication system 100 according to one embodiment of the present invention that includes a central control node 10 and multiple antennas 20, of which three are shown. The multiple antennas 20 are deployed across a plurality of geographically contiguous cells 30 and are each configured to transmit downlink signals to, or receive uplink signals from, one or more mobile terminals 40 over an air interface. In this respect, the system 100 employs time-division duplexing (TDD). That is, the multiple antennas 20 are configured to transmit downlink signals to mobile terminals 40 during some time intervals, i.e., transmit intervals, and to receive uplink signals from mobile terminals 40 during other time intervals, i.e., receive intervals.

With signals being transmitted or received in geographically contiguous cells 30 during the same time interval, interference between the cells 30 (i.e., inter-cell interference) can occur. Accordingly, each cell communicates, e.g., via fiber optic cable, with the central control node 10. The central control node 10 coordinates and/or jointly processes the signals being transmitted or received so as to minimize inter-cell interference. To jointly process downlink signals transmitted from the multiple antennas 20, in particular, the central control node 10 estimates the downlink channel responses from uplink signals received at the multiple antennas 20, based on the assumption of reciprocity between the downlink and uplink channel.

Figure 2:
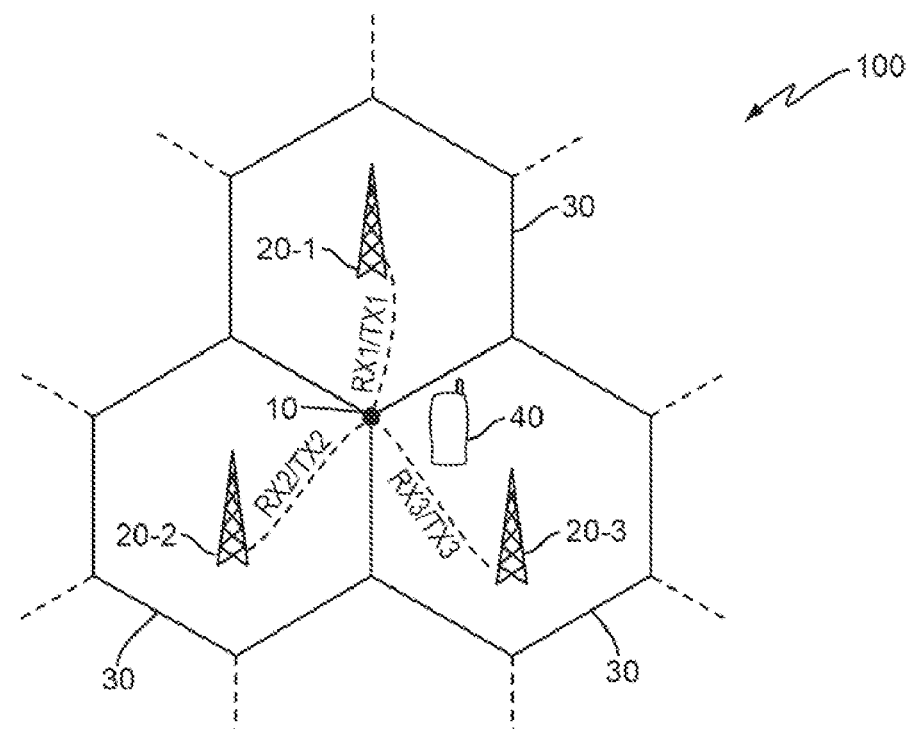
FIG. 2 illustrates the transmit-receive radio frequency (RF) chains of several antennas in the system according to one embodiment of the present invention.

Of course, each of the multiple antennas 20 is connected to a corresponding transceiver that comprises a transmit-receive radio frequency (RF) chain. FIG. 2 generally illustrates the transmit-receive RF chain for several exemplary antennas, 20-1, 20-2, and 20-3. Antenna 20-1, for instance, is connected to transmit chain TX1 and receive chain RX1, while antenna 20-2 is connected to transmit chain TX2 and receive chain RX2, and antenna 20-3 is connected to transmit chain TX3 and receive chain RX3. To maintain reciprocity between downlink and uplink, and therefore to estimate the downlink channel responses from uplink signals, the frequency responses H(f) of these RF chains must satisfy the relation:

$$H_{TX1}(f)H^*_{RX1}(f)=H_{TX2}(f)H^*_{RX2}(f)=H_{TX3}(f)H^*_{RX3}(f)=\ldots \quad (1)$$

for all RF chains. See, e.g., Jiann-Ching Guey and L. Daneil Larsson, "*Modeling and Evaluation of MIMO Systems Exploiting Channel Reciprocity in TDD mode,*" Proceeding, IEEE VTC 2004 Fall. The frequency responses H(f) of the RF chains however may not satisfy this relation if, for example, mismatches in the hardware components making up the RF chains cause the RF chains to have different transfer characteristics.

Figure 3:
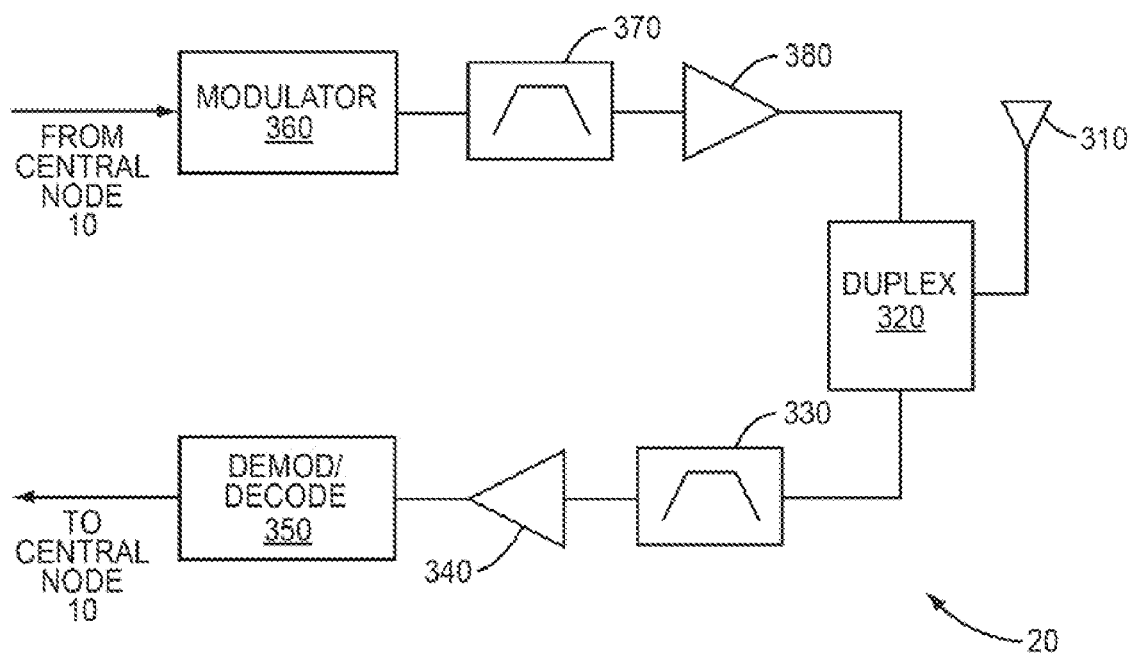
FIG. 3 is a block diagram illustrating a simplified example of a transmit-receive RF chain of an antenna in the system according to one embodiment of the present invention.

FIG. 3, for instance, illustrates a simplified example of various hardware components included in the transmit-receive RF chain of an antenna 20 according to one embodiment. As shown in FIG. 3, a transmit-receive RF chain of an antenna 20 includes one or more physical antennas 310 and a duplexer 320 that permits full duplex communications over the same one or more physical antennas 310. RF signals received by the one or more physical antennas 310 are passed by the duplexer 320 to a receive chain, which includes a filter 330 that suppresses signals outside the primary frequency band and an amplifier 340 (e.g., a low-noise amplifier, LNA) that increases the strength of the received signals passed by the filter 330. Other components may include one or more mixers, etc. for down-converting the received signals to a lower frequency. Having been conditioned in this way, the received signals are thereafter demodulated and decoded by subsequent components 350 before being communicated to the central control node 10. Similarly, signals from the central control node 10 to be transmitted by an antenna 20 propagate through a transmit chain, which includes components 360 that modulate and encode the signals, one or more mixers for up-converting the signals to a higher frequency, and a filter 370 and amplifier 380 for converting the signals into signals suitable for transmission by the one or more physical antennas 310.

The operating parameters of these and other hardware components of a transmit-receive RF chain may differ within any given antenna 20, as well as between different antennas 20. Such mismatches may cause the RF chains of the antennas 20 to have different transfer characteristics, so that the frequency responses H(f) of the RF chains fail to satisfy the relation in equation (1).

Accordingly, the system 100 includes a calibration controller configured to calibrate the RF chains of the antennas 20 (e.g., by adjusting one or more operating parameters of the components in the RF chains) so that the RF chains' frequency responses H(f) do in fact satisfy the relation in Equation (1). Moreover, the system 100 is self-calibrating in the sense that it advantageously does not rely on mobile terminals 40 to assist with the calibration process, and does not require feedback of downlink channel responses. Rather, the system 100 transmits pilot signals amongst the antennas 20 themselves, and then calculates RF-chain calibration factors for the antennas 20 based on those pilot signals.

Figure 4:
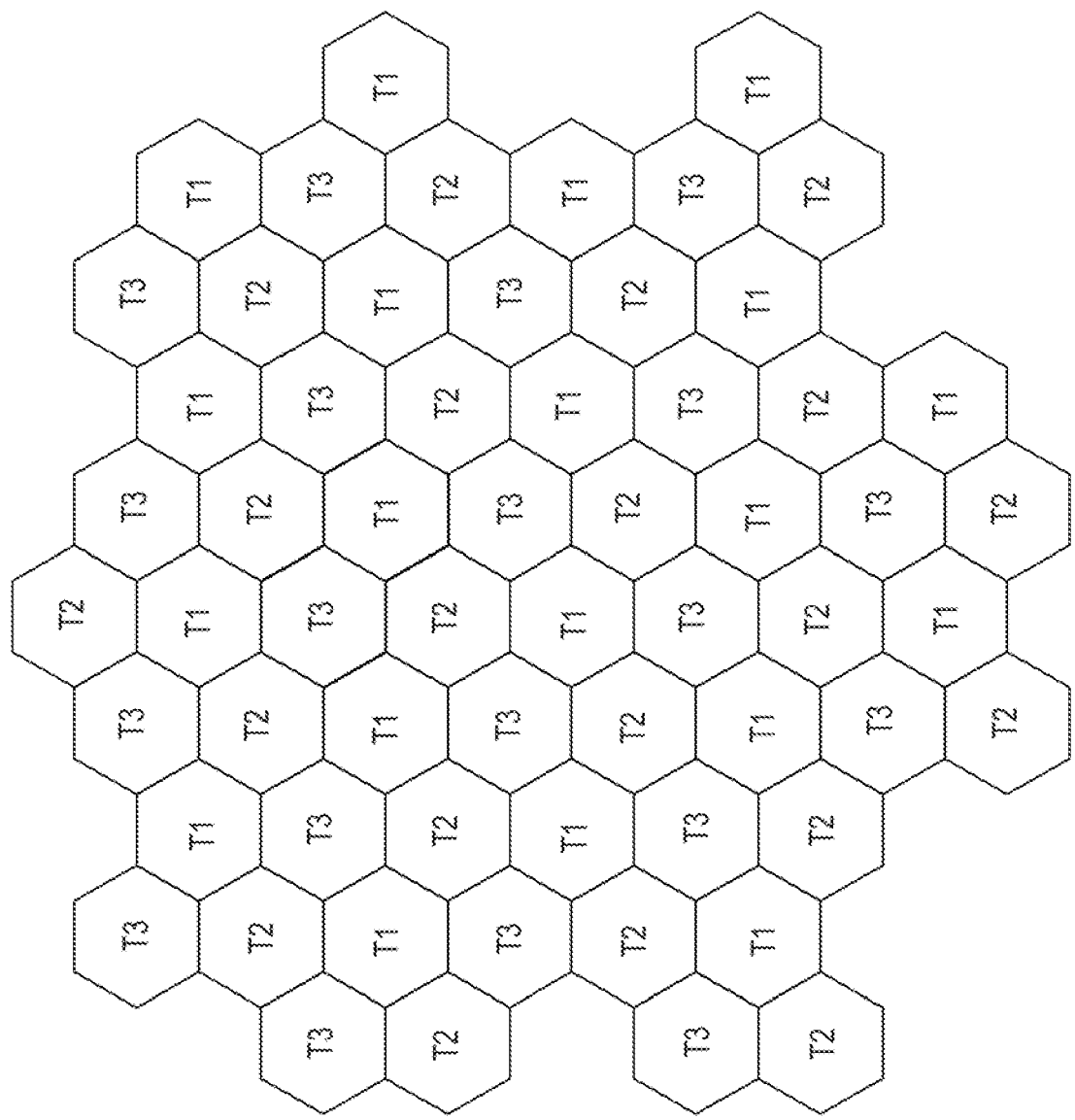
FIG. 4 illustrates time-reuse groups of a self-calibrating multi-antenna wireless communication system according to one embodiment of the present invention.

FIG. 4 illustrates additional details of this network-wide calibration process according to one embodiment of the present invention. As shown in FIG. 4, each of a plurality of geographically contiguous cells 30 (and thereby each of a plurality of corresponding antennas 20) belongs to one of at least three time-reuse groups, depicted by T1, T2, and T3. The time-reuse groupings are geographically dispersed, similar to a traditional cellular network frequency reuse pattern, to geographically separate all antennas 20 belonging to the same time-reuse group. Due to this separation, pilot signals concurrently transmitted from antennas 20 belonging to the same time-reuse group do not significantly interfere with one another.

The calibration controller, which may be implemented at the central control node 10 or at some other node in the system 100 (e.g., at one of the antennas 20), coordinates the transmission and reception of pilot signals amongst the antennas 20 during different time intervals. These time intervals may be different time intervals of the original TDD cycle, such that instead of transmitting downlink signals to or receiving uplink signals from mobile terminals 40 during a given time interval of the original TDD cycle, the antennas 20 transmit and receive pilot signals amongst themselves for calibration.

Figure 5:
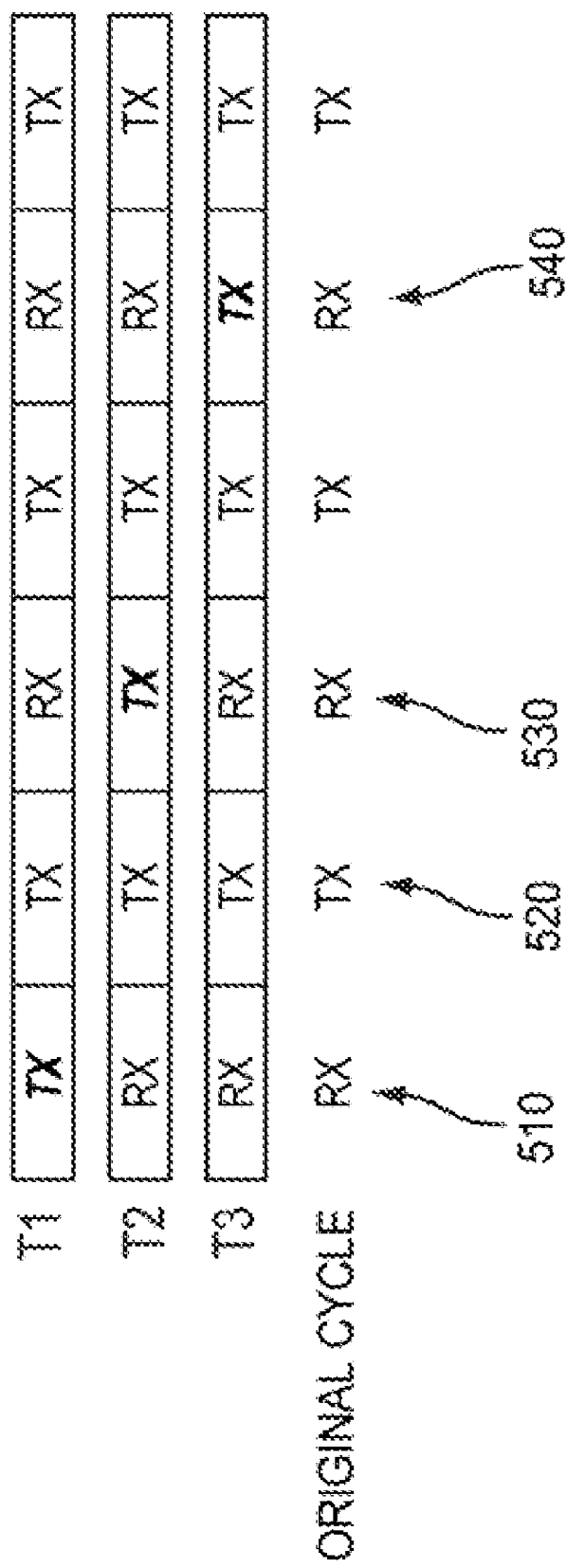
FIG. 5 illustrates receive intervals of a time division duplexing (TDD) cycle during which pilot signals are transmitted amongst antennas in a self-calibrating multi-antennas wireless communication system, according to one embodiment of the present invention.

In one embodiment shown in FIG. 5, for example, the calibration controller coordinates the transmission and reception of pilot signals amongst the antennas 20 during different receive (RX) intervals of the original TDD cycle. During a first RX interval 510 of the original TDD cycle, the calibration controller transmits a pilot signal from each antenna 20 in the first time-reuse group T1, so that the pilot signals are received at the antennas 20 in the second and third time-reuse groups T2 and T3. Then, during a second RX interval 530 of the TDD cycle, which may for instance occur after one or more intervening transmit (TX) intervals 520 of the TDD cycle, the calibration controller transmits a pilot signal from each antenna 20 in the second time-reuse group T2, so that the pilot signals are received at the antennas 20 in the first and third time-reuse groups T1 and T3. Similarly, during a third RX interval 540 of the TDD cycle, the calibration controller transmits a pilot signal from each antenna 20 in the third time-reuse group T3, so that the pilot signals are received at the antennas 20 in the first and second time-reuse groups T1 and T2.

Based on these pilot signals received amongst the antennas 20, the calibration controller is configured to calculate an RF-chain calibration factor $\rho(f)$ for each of one or more of the antennas 20. The calibration factor $\rho(f)$ calculated for a given antenna 20 accounts for a frequency response H(f) difference between the RF chain of that antenna 20 and the RF chain of another one of the antennas 20.

Figure 6:
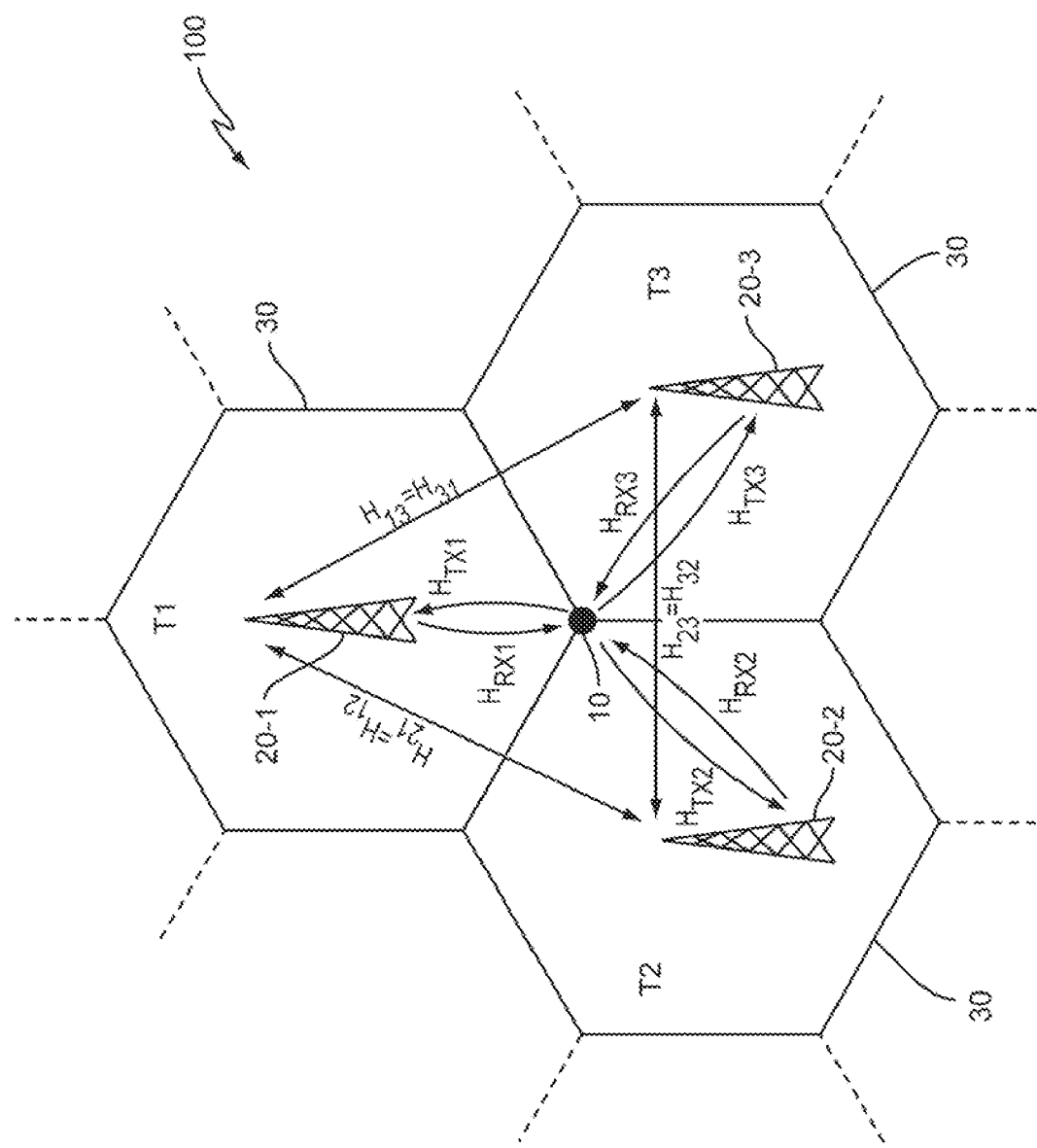
FIG. 6 illustrates details regarding the pilot signals received in a self-calibrating multi-antenna wireless communication system according to one embodiment of the present invention.

Consider, for instance, FIG. 6 which illustrates the calculation of RF-chain calibration factors $\rho(f)$ for several exemplary antennas 20 in the system 100. In FIG. 6, the system 100 includes antennas 20-1, 20-2, and 20-3 belonging to the first, second, and third time-reuse groups T1, T2, and T3, respectively. When the calibration controller transmits a pilot signal from antenna 20-1 during the first receive interval 510, the pilot signal propagates from the central control node 10 through the TX chain of antenna 20-1, which has a frequency response $H_{TX1}(f)$. The pilot signal then propagates through air interfaces to antennas 20-2 and 20-3. With respect to antenna 20-2, the pilot signal propagates through a channel having a frequency response $H_{12}(f)$, and then propagates through the RX chain of antenna 20-2, having a frequency response $H_{RX2}(f)$, back to the central control node 10. Accordingly, the pilot signal received from the RX chain of antenna 20-2 when antenna 20-1 transmits a pilot signal during the first receive interval 510 is given by:

$$R_{12}(f) = H_{TX1}(f) H_{12}(f) H_{RX2}(f), \quad (2)$$

assuming negligible noise. Likewise, with respect to antenna 20-3, the pilot signal propagates through a channel having a frequency response $H_{13}(f)$, and then propagates through the RX chain of antenna 20-3, having a frequency response $H_{RX3}(f)$, back to the central control node 10. The pilot signal received from the RX chain of antenna 20-3 when antenna 20-1 transmits a pilot signal during the first receive interval 510 is therefore given by:

$$R_{13}(f) = H_{TX1}(f) H_{13}(f) H_{RX3}(f) \quad (3)$$

Similarly, the pilot signals received from the RX chains of antennas 20-1 and 20-3 when antenna 20-2 transmits a pilot signal during the second receive interval 530 are given by:

$$R_{21}(f) = H_{TX2}(f) H_{21}(f) H_{RX1}(f)$$

$$R_{23}(f) = H_{TX2}(f) H_{23}(f) H_{RX3}(f) \quad (4)$$

And finally, the pilot signals received from the RX chains of antennas 20-1 and 20-2 when antenna 20-3 transmits a pilot signal during the third receive interval 540 are given by:

$$R_{31}(f) = H_{TX3}(f) H_{31}(f) H_{RX1}(f)$$

$$R_{32}(f) = H_{TX3}(f) H_{32}(f) H_{RX2}(f) \quad (5)$$

Based on these received pilot signals, the calibration controller in one embodiment calculates RF-chain calibration factors $\rho_{12}(f)$, $\rho_{13}(f)$ for antennas 20-2 and 20-3, respectively, using antenna 20-1 as a reference for the calibration. That is, the calibration controller calculates an RF-chain calibration factor $\rho_{12}(f)$ for antenna 20-2 that accounts for a frequency response difference between the RF chain of antenna 20-2 and the RF chain of antenna 20-1. Likewise, the calibration controller calculates an RF-chain calibration factor $\rho_{13}(f)$ for antenna 20-3 that accounts for a frequency response difference between the RF chain of antenna 20-3 and the RF chain of antenna 20-1. Specifically, the calibration controller calculates $\rho_{12}(f)$ and $\rho_{13}(f)$ as:

$$\rho_{12}(f) = \frac{R_{12}(f)}{R_{21}(f)} = \frac{H_{TX1}(f) H_{12}(f) H_{RX2}(f)}{H_{TX2}(f) H_{21}(f) H_{RX1}(f)}, \quad (6)$$

-continued $$\rho_{13}(f) = \frac{R_{13}(f)}{R_{31}(f)} = \frac{H_{TX1}(f)H_{13}(f)H_{RX3}(f)}{H_{TX3}(f)H_{31}(f)H_{RX1}(f)}.$$

Of course, much like the downlink and uplink channels between an antenna 20 and a mobile terminal 40, the transmit and receive channels between any two antennas 20 are reciprocal. Accordingly, $H_{12}(f)H_{21}(f)$ and $H_{13}(f)=H_{31}(f)$, meaning that $\rho_{12}(f)$ and $\rho_{13}(f)$ simplify to:

$$\rho_{12}(f) = \frac{H_{TX1}(f)H_{RX2}(f)}{H_{TX2}(f)H_{RX1}(f)}, \quad (7)$$

$$\rho_{13}(f) = \frac{H_{TX1}(f)H_{RX3}(f)}{H_{TX3}(f)H_{RX1}(f)}.$$

Then, assuming that each RF chain has unit gain, introduces only time delay and phase rotation, and thus satisfies $H_{TXi}(f)H^*_{TXi}(f)=H_{RXj}(f)H^*_{RXj}(f)=1$ for all TX chains i and all RX chains j:

$$\rho_{12}(f) = \frac{H_{TX1}(f)H_{RX2}(f)}{H_{TX2}(f)H_{RX1}(f)} \cdot \frac{H^*_{RX2}(f)H^*_{RX1}(f)}{H^*_{RX2}(f)H^*_{RX1}(f)} \quad (8)$$

$$= \frac{H_{TX1}(f)H^*_{RX1}(f)}{H^*_{RX2}(f)H^*_{RX1}(f)}$$

$$\rho_{13}(f) = \frac{H_{TX1}(f)H_{RX3}(f)}{H_{TX3}(f)H_{RX1}(f)} \cdot \frac{H^*_{RX3}(f)H^*_{RX1}(f)}{H^*_{RX3}(f)H^*_{RX1}(f)}$$

$$= \frac{H_{TX1}(f)H^*_{RX1}(f)}{H_{TX3}(f)H^*_{RX3}(f)}$$

Having calculated the calibration factors in this way, the calibration controller in some embodiments adjusts the RF chain of antenna 20-2 and 20-3 based on the corresponding calibration factors, $\rho_{12}(f)$ and $\rho_{13}(f)$, respectively. For example, the calibration controller may adjust the TX chains of antennas 20-2 and 20-3 according to:

$$\tilde{H}_{TX2}(f)=\rho_{12}(f)H_{TX2}(f),$$

$$\tilde{H}_{TX3}(f)=\rho_{13}(f)H_{TX3}(f), \quad (9)$$

such that:

$$H_{TX1}(f)H^*_{RX1}(f)=\tilde{H}_{TX2}(f)H^*_{RX2}(f)=\tilde{H}_{TX3}(f)H^*_{RX3}(f)=\ldots \quad (10)$$

Alternatively, the calibration controller may adjust the RX chains of antennas 20-2 and 20-3 according to:

$$\tilde{H}^*_{RX2}(f)=\rho_{12}(f)H^*_{RX2}(f),$$

$$\tilde{H}^*_{RX3}(f)=\rho_{13}(f)H^*_{RX3}(f), \quad (11)$$

such that:

$$H_{TX1}(f)H^*_{RX1}(f)=H_{TX2}(f)\tilde{H}^*_{RX2}(f)=H_{TX3}(f)\tilde{H}^*_{RX3}(f)=\ldots \quad (12)$$

Those skilled in the art will nonetheless appreciate that the above represents a non-limiting example of the calibration process, and that the calibration controller may therefore calculate RF-chain calibration factors $\rho(f)$ for each of one or more of the antennas 20-1, 20-2, and 20-3, using any one of those antennas 20 as a reference for the calibration.

Further, those skilled in the art will appreciate that the calibration controller is not limited to adjusting the TX or RX chains of the antennas 20 based on the corresponding calibration factors $\rho(f)$, as described above. Rather, the calibration controller may instead be configured in some embodiments to apply the corresponding calibration factors $\rho(f)$ to a downlink data transmission being sent from those antennas 20, and thereby adjust the frequency response of the outgoing data transmission rather than the TX chains themselves. Likewise, the calibration controller may be configured in some embodiments to apply the corresponding calibration factors $\rho(f)$ to an uplink data transmission being received at those antennas 20, and thereby adjust the frequency response of the received data transmission rather than the RX chains themselves.

Still further, those skilled in the art will appreciate that transmitting and receiving pilot signals amongst the antennas 20 during different RX intervals of the original TDD cycle in this way may, at least temporarily, reduce the uplink capacity of the system 100. That is, the calibration controller may temporarily suspend scheduling of uplink data transmissions from the mobile terminals 40 to the antennas 20 during these RX intervals, so that the antennas 20 can transmit and receive the pilot signals amongst themselves during that time. This, of course, may be acceptable during periods of relatively low utilization of the system's uplink capacity, but may be unacceptable during periods of relatively high utilization of the uplink capacity—especially if the system's downlink capacity is experiencing relatively low utilization.

Figure 7:
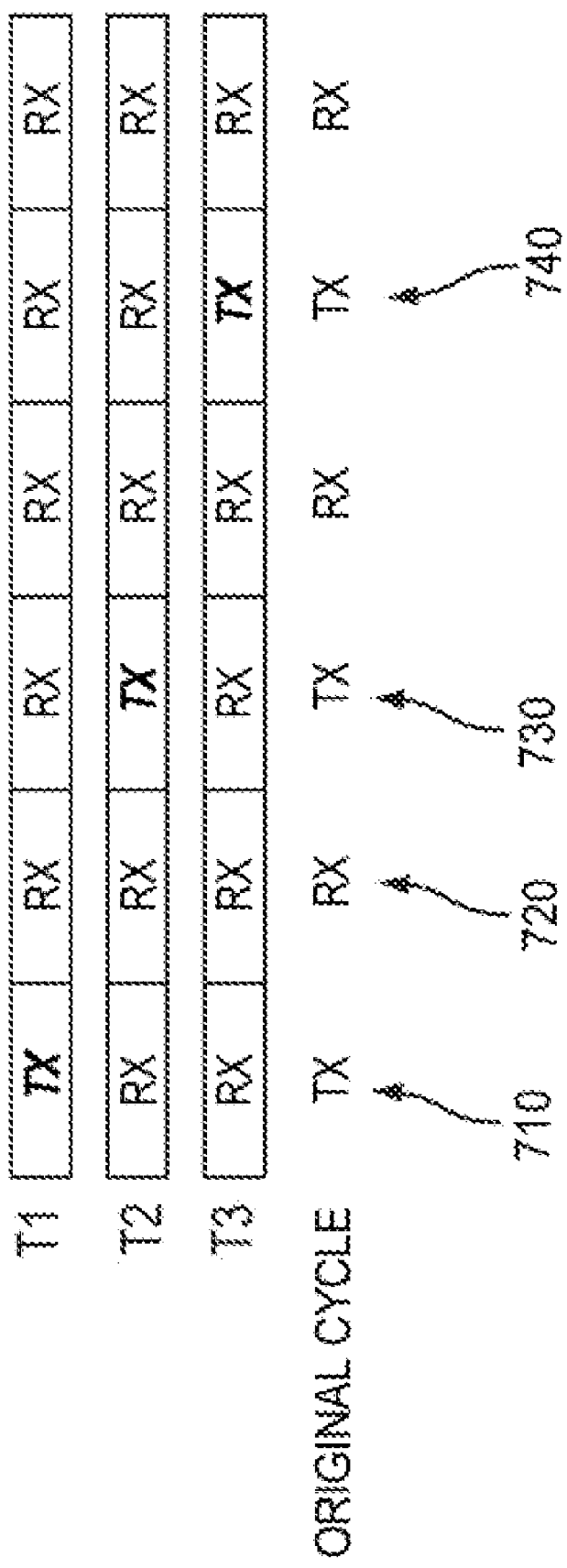
FIG. 7 illustrates transmit intervals of a TDD cycle during which pilot signals are transmitted amongst antennas in a multi-antenna wireless communication system according to one embodiment of the present invention.

According to some embodiments, therefore, instead of coordinating the transmission and reception of pilot signals amongst the antennas 20 during different RX intervals of the original TDD cycle, the calibration controller may coordinate such transmission and reception during different TX intervals of the original TDD cycle. FIG. 7 illustrates an example of such an embodiment. As shown in FIG. 7, during a first TX interval 710 of the original TDD cycle, the calibration controller transmits a pilot signal from each antenna 20 in the first time-reuse group T1, so that the pilot signals are received at the antennas 20 in the second and third time-reuse groups T2 and T3. Then, during a second TX interval 730 of the TDD cycle, which may for instance occur after one or more intervening RX intervals 720 of the TDD cycle, the calibration controller transmits a pilot signal from each antenna 20 in the second time-reuse group T2, so that the pilot signals are received at the antennas 20 in the first and third time-reuse groups T1 and T3. Similarly, during a third TX interval 740 of the TDD cycle, the calibration controller transmits a pilot signal from each antenna 20 in the third time-reuse group T3, so that the pilot signals are received at the antennas 20 in the first and second time-reuse groups T1 and T2. The calibration controller then calculates an RF-chain calibration factor $\rho(f)$ for each of one or more of the antennas 20, based on these pilot signals received, in much the same way as described above.

Similar to previous embodiments, transmitting and receiving pilot signals amongst the antennas 20 during different TX intervals of the original TDD cycle in this way may, at least temporarily, reduce the downlink capacity of the system 100. That is, the calibration controller may temporarily suspend scheduling of downlink data transmissions from the antennas 20 to the mobile terminals 40 during these TX intervals, so that the antennas 20 can transmit and receive the pilot signals amongst themselves during that time. This, again, may be acceptable during periods of relatively low utilization of the system's downlink capacity, but may be unacceptable during periods of relatively high utilization of the downlink capacity—especially if the system's uplink capacity is experiencing relatively low utilization.

Accordingly, in some embodiments, the calibration controller is configured to dynamically switch between transmitting and receiving pilot signals during different RX intervals, and transmitting and receiving pilot signals during different TX intervals. This dynamic switching may be based, at least in part, on the current utilization level of the system's downlink and/or uplink capacity.

Regardless, the calibration controller may, in some embodiments, perform the calibration described above with respect to the three exemplary antennas 20-1, 20-2, and 20-3 for a relatively large number of antennas 20. That is, due to the above described coordination of transmission and reception of pilot signals amongst the antennas 20, the calibration process scales even to a relatively large number of antennas 20. These antennas 20 may be for instance all, or substantially all, of the antennas 20 jointly processing a given signal, or all, or substantially all, of the antennas 20 under the control of a given central control node 10 in the system 100.

Figure 8:
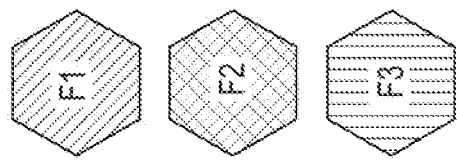
FIG. 8 illustrates time-reuse, and frequency-reuse, groups of a self-calibrating multi-antenna wireless communication system according to one embodiment of the present invention.
Figure 8:
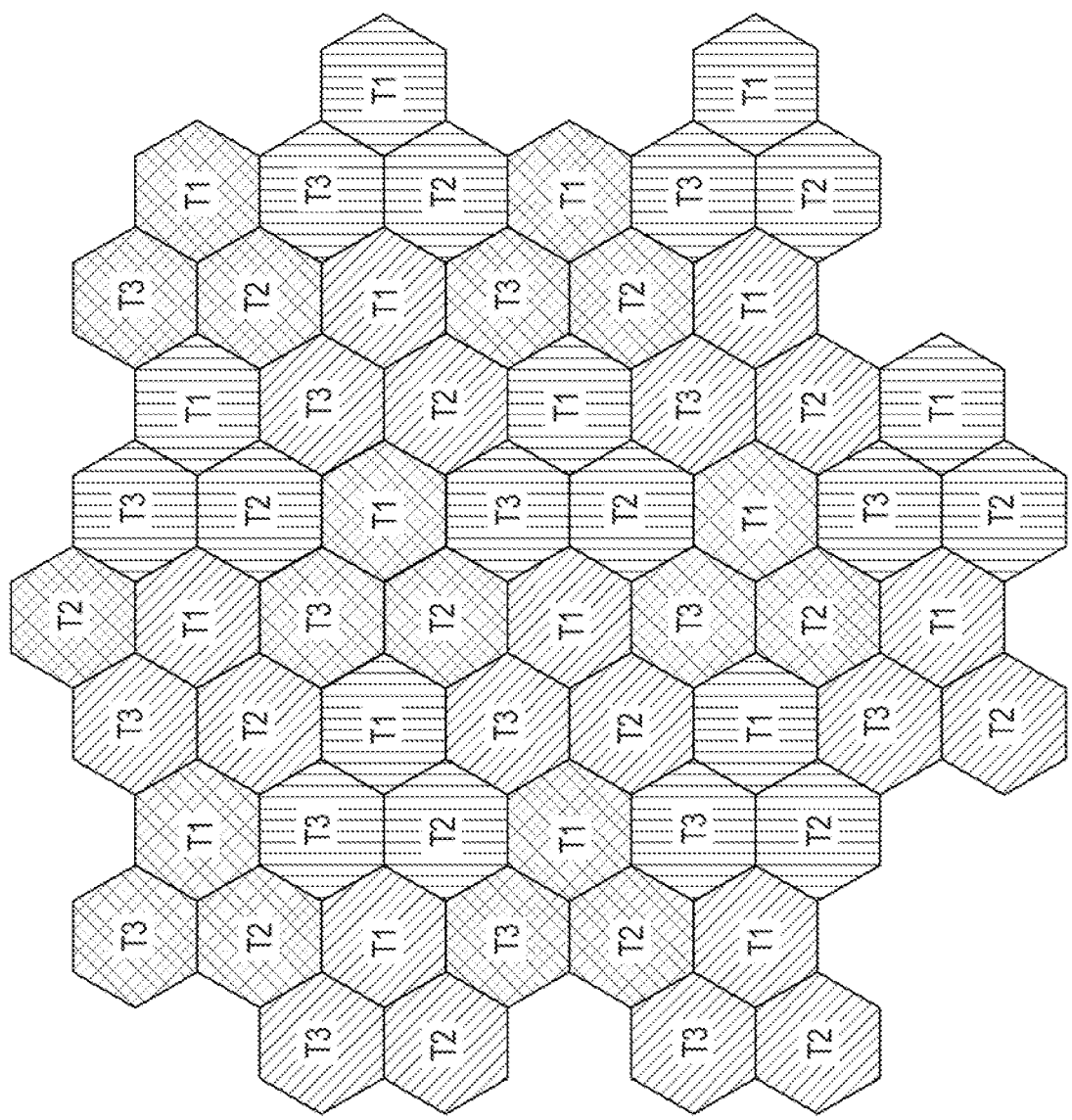

Regardless of the number of antennas 20 per se, though, the calibration controller may in some embodiments coordinate the transmission and reception of pilot signals from the antennas 20 so as to further reduce the possibility of interference between those pilot signals. As shown in FIG. 8, for example, the calibration controller is configured in one, embodiment to transmit a pilot signal from the antennas 20 belonging to the first time-reuse group T1 by using a different transmit frequency for each of two or more subsets of those antennas 20. Specifically, each of the antennas 20 belonging to the first time-reuse group T1 also belong to one of at least three frequency-reuse groups, depicted by F1, F2, and F3 (and their corresponding pattern). The frequency-reuse groups F1, F2, and F3 transmit signals using different transmit frequencies. Similar to the time-reuse groups T1, T2, and T3, the frequency-reuse groups are geographically dispersed to geographically separate all antennas belonging to the same frequency-reuse group. Due to this time, and now frequency, separation, pilot signals concurrently transmitted from antennas belonging to the first time-reuse group T1 and the same frequency-reuse group are even less likely to significantly interfere with one another.

The same can be said for the second and third time-reuse groups T2 and T3, as illustrated in FIG. 8. That is, the calibration controller is configured to transmit a pilot signal from the antennas 20 belonging to the second time-reuse group T2 by using a different transmit frequency for each of two or more subsets of those antennas 20, and to transmit a pilot signal from the antennas 20 belonging to the third time-reuse group T3 by using a different transmit frequency for each of two or more subsets of those antennas 20.

In some embodiments, the pilot signals for the different subsets of antennas 20 in a given time-reuse group (and thereby the pilot signals for different frequency-reuse groups) are sent using different contiguous blocks of frequencies. In other embodiments, these pilot signals are sent using different sets of frequencies, where each set includes a number of non-contiguous frequencies spread out across a given frequency band. In these latter embodiments, the calibration controller is advantageously able to calculate the calibration factors $\rho(f)$ based on estimates determined over the entire frequency band, rather than just some sub-block of the frequency band.

Consider, for example, FIG. 9A, which illustrates spreading pilot signals out across a given frequency band using interleaved frequency division multiplexing (IFDMA). As shown in FIG. 9A, the calibration controller is configured to, during a first receive interval 910, transmit a pilot signal from antennas 20 belonging to the first time-reuse group T1. The transmissions from these antennas 20 are each transmissions at two or more distinct frequencies. That is, the antennas 20 belonging to a given subset, or frequency-reuse group, e.g., F3, each transmit a pilot signal on a set of equally spaced, distinct, and non-contiguous frequencies spanning the frequency band. Antennas 20 belonging to a different subset, or frequency-reuse group, e.g., F2, each transmit a pilot signal on a different set of equally spaced, distinct, and non-contiguous frequencies spanning the frequency band. These sets are uniquely offset with one another, such that the sets do not overlap, but rather are interleaved with one another. Thus, the pilot signal transmissions from different subsets of time-reuse group T1 are interleaved in frequency.

The same can be said of the pilot signal transmissions from different subsets of time-reuse groups T2 and T3. As also seen in FIG. 9A, for instance, the calibration controller is configured to, during a second receive interval 920, transmit a pilot signal from antennas 20 belonging to the second time-reuse group T2, and to, during a third receive interval 930, transmit a pilot signal from antennas 20 belonging to the third time-reuse group T3. The pilot signal transmissions from different subsets of these time-reuse groups T2, and T3, are also interleaved in frequency.

Figure 9B:
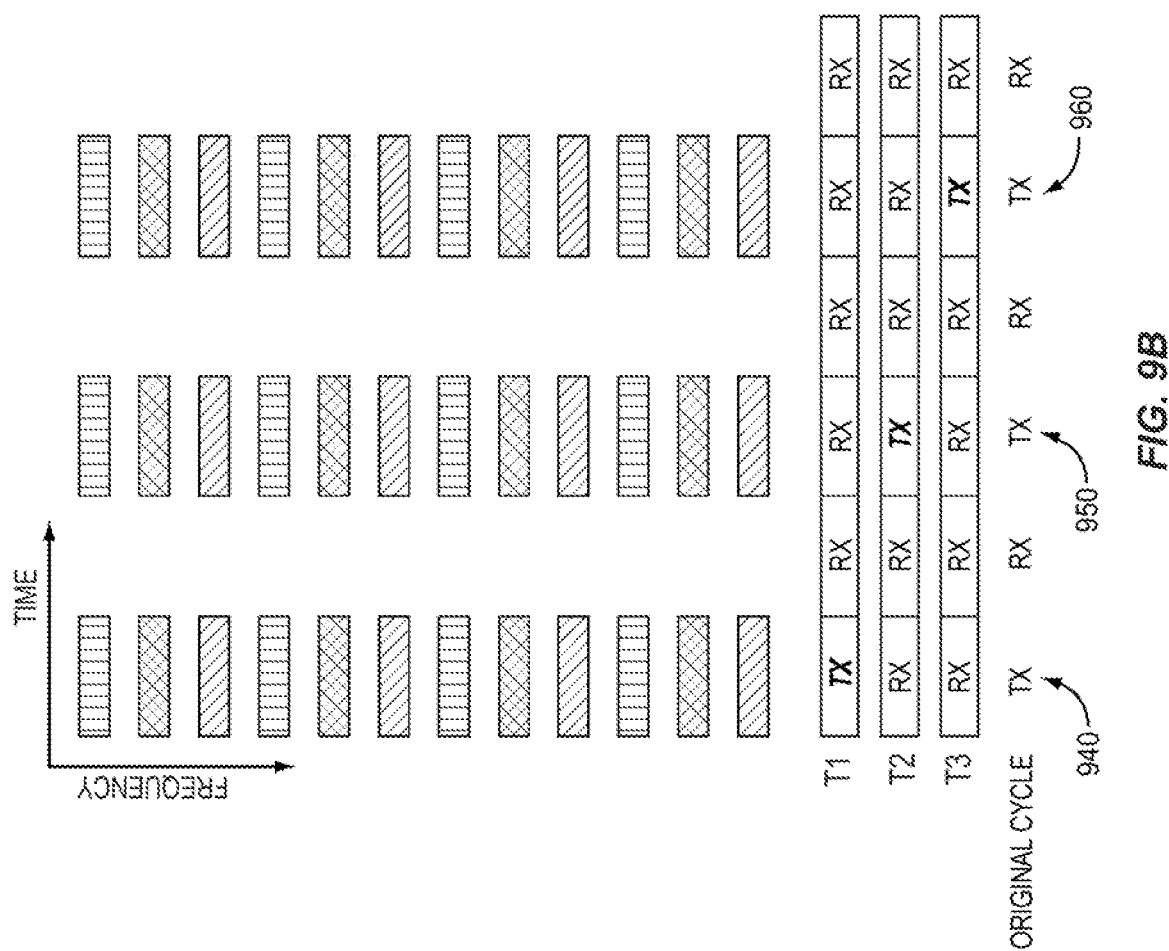
Figure 10A:
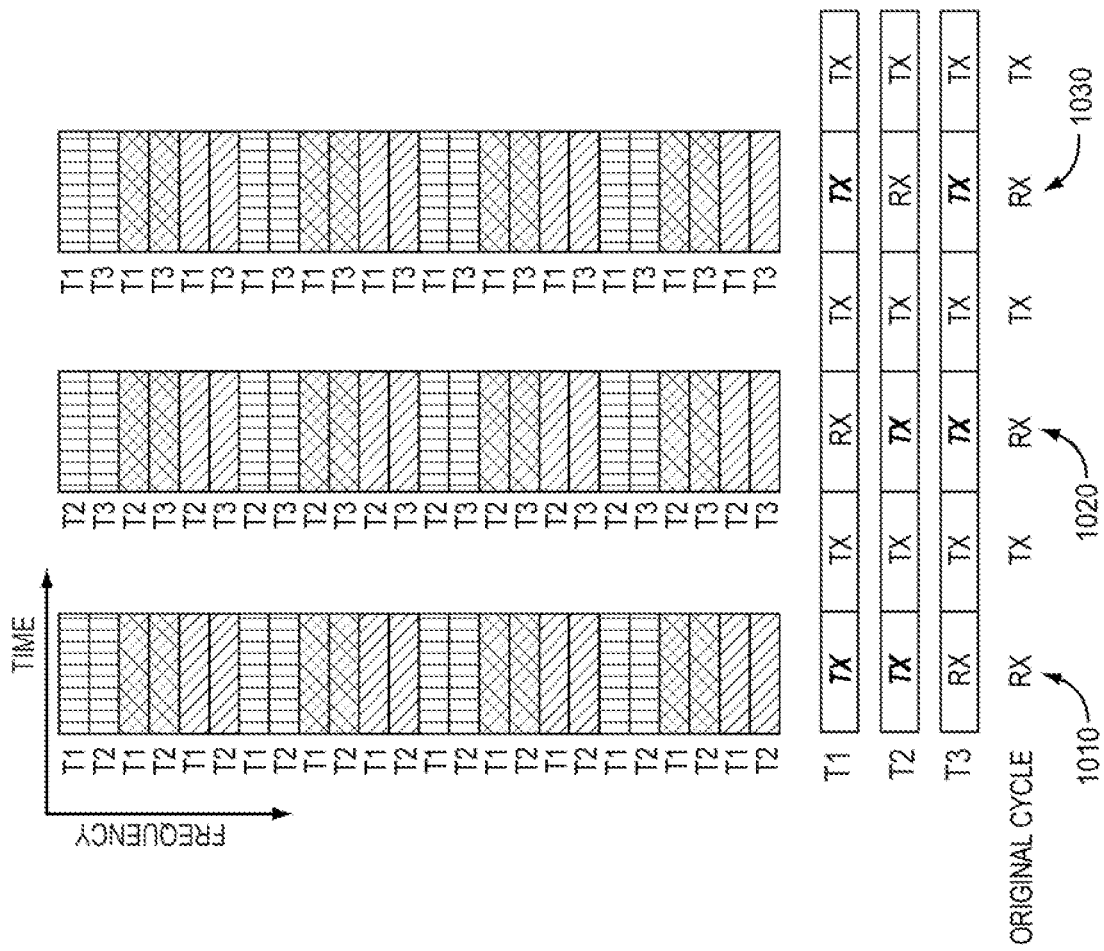
FIGS. 10A-10B illustrate time intervals of a TDD cycle during which pilot signals are transmitted amongst antennas, using different frequencies, in a self-calibrating multi-antennas wireless communication system, according to another embodiment of the present invention.
Figure 10B:
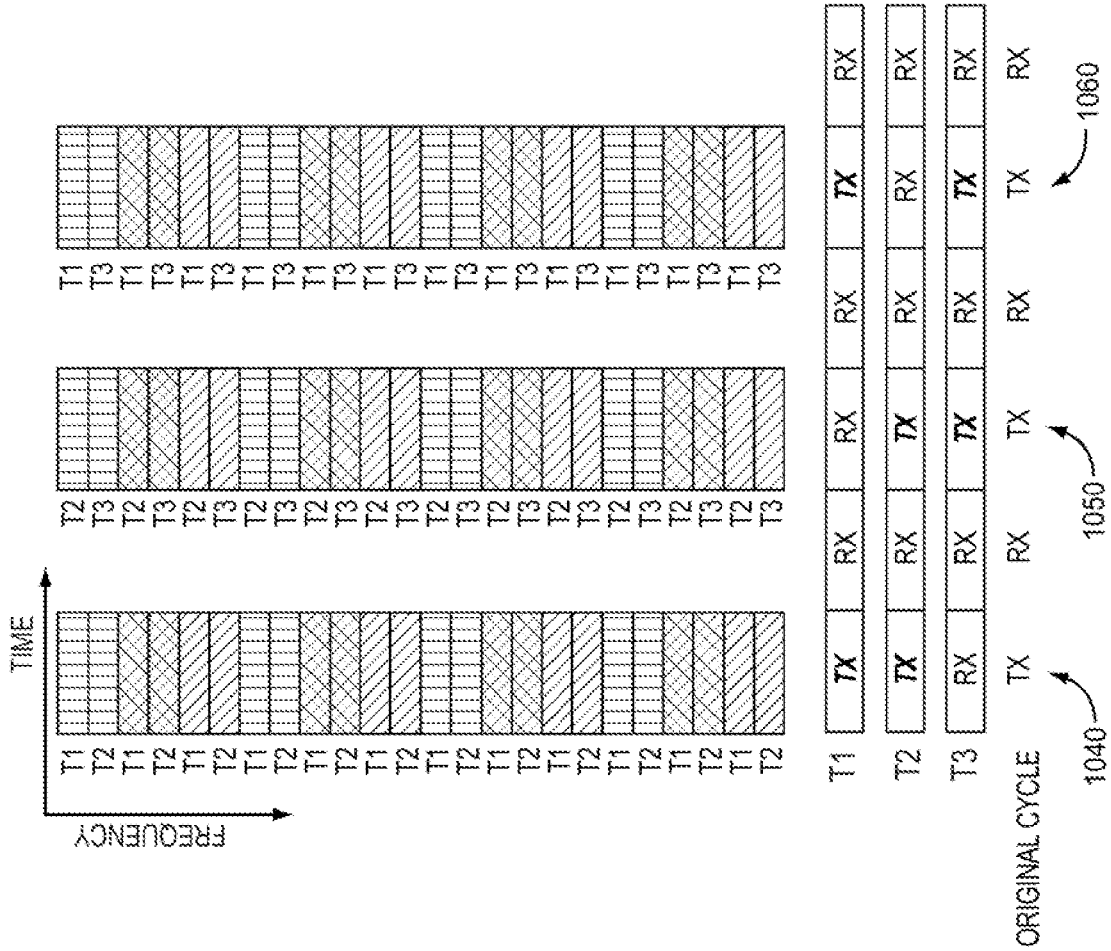

Of course, much in the same way as described above, the calibration controller is not limited to coordinating the transmission and reception of pilot signals during different RX intervals, but rather may coordinate such transmissions and reception during different TX intervals. FIG. 9B, therefore, illustrates this embodiment for a calibration controller also configured to transmit the pilot signals by using a different transmit frequency for each of two or more subsets of the antennas 20 belonging to a given time-reuse group, The calibration controller has been described above as being configured to, during a given time interval, transmit pilot signals from only those antennas belonging to one time-reuse group, and to receive those pilot signals at the other, e.g., two, time-reuse groups. In other embodiments, however, the calibration controller is configured to, during a given time interval, transmit pilot signals from those antennas belonging to any of two or more time-reuse groups, and to receive those pilot signals at the other, e.g., one, time-reuse group. FIGS. 10A and 10B illustrate one such embodiment.

In FIG. 10A, the calibration controller is configured to, during a first RX interval 1010, transmit a pilot signal from each antenna 20 in the first time-reuse group T1, and also each antenna 20 in the second time-reuse group T2, so that the pilot signals are received at the antennas 20 in the third time-reuse group T3. The pilot signals of the first and second time-reuse groups T1 and T2 are separated by using different frequencies for the transmissions of those pilot signals. Likewise, the calibration controller is configured to, during a second RX interval 1020, transmit a pilot signal from each antenna 20 in the second time-reuse group T2, and also each antenna 20 in the third time-reuse group T3, so that the pilot signals are received at the antennas 20 in the first time-reuse group T1. Finally, the calibration controller is configured to, during a third RX interval 1030, transmit a pilot signal from each antenna 20 in the first time-reuse group T1, and also each antenna 20 in the third time-reuse group T3, so that the pilot signals are received at the antennas 20 in the second time-reuse group T2. The calibration controller then calculates an RF-chain calibration factor $\rho(f)$ for each of one or more of the antennas 20, based on these pilot signals received, in much the same way as described above.

FIG. 10B illustrates this same configuration, whereby during a given time interval antennas 20 from two or more time-reuse groups transmit pilot signals, but where the calibration controller is configured to transmit these pilot signals during different TX intervals rather than in RX intervals.

Those skilled in the art will readily appreciate that while the calibration controller described above with respect to FIG. 8-10B was configured to transmit a pilot signal from the antennas 20 by using different transmit frequencies, to further separate the pilot signals, the calibration controller in other embodiments may alternatively or additionally be configured to transmit a pilot signal from the antennas by using different orthogonal codes. That is, the antennas belonging to a given time-reuse group may further belong to one of at least three code-reuse groups, instead of or in addition to belonging to one of at least three frequency-reuse groups. Further separated in this way, the calibration controller may be configured to transmit pilot signals amongst the antennas 20 with even less interference.

Those skilled in the art will also appreciate that the calibration process depicted in the various figures described above may be continually, or periodically, carried out as part of a larger process. The time intervals depicted above therefore may be repeated continually, or periodically, as needed to carry out network-wide calibration.

Figure 11:
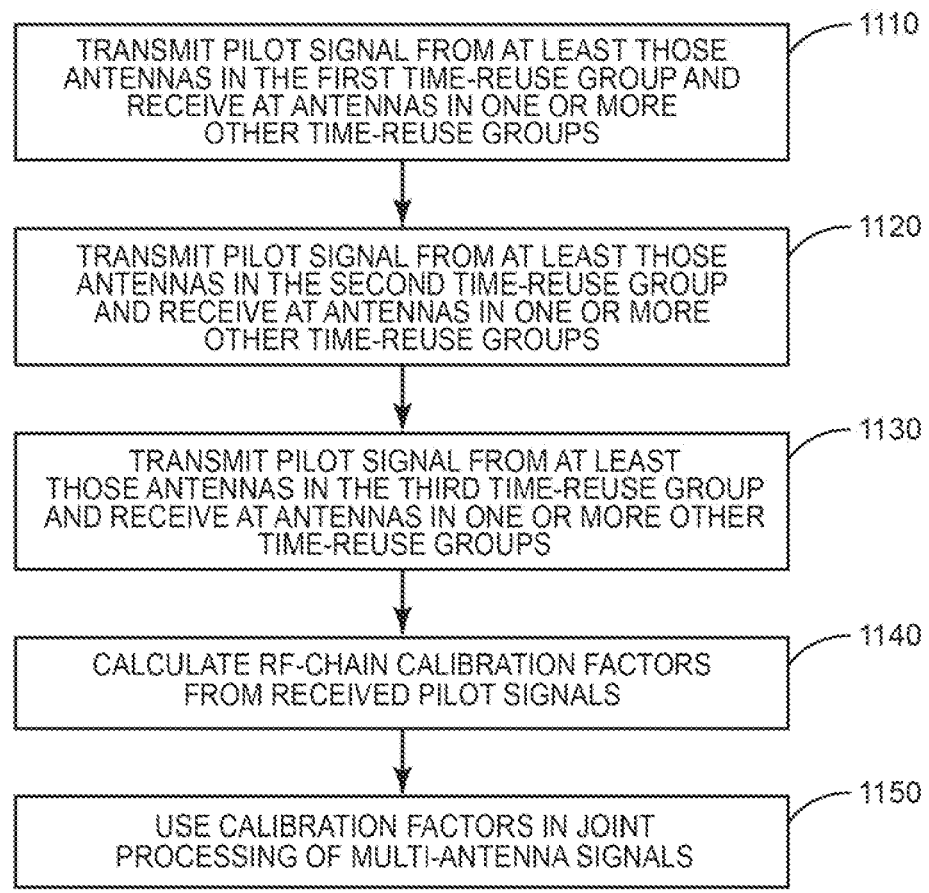
FIG. 11 is a logic flow diagram of a method of calibrating system frequency responses for joint antenna processing in a multi-antenna wireless communication system according to one embodiment of the present invention.

With the above points of variation and implementation of the self-calibrating multi-antenna system 100 in mind, those skilled in the art will appreciate that a calibration controller of the system 100 generally performs the method illustrated in FIG. 11 for calibrating the transmit-receive RF chains of antennas 20 in the system 100. According to FIG. 11, the calibration controller, during a first time interval, transmits a pilot signal from at least those antennas 20 in a first time-reuse group T1 and receiving the pilot signal at antennas 20 in one or more other time-reuse groups (e.g., either T2, T3, or both T2 and T3) (Block 1110). The calibration controller further, during a second time interval, transmits a pilot signal from at least those antennas 20 in a second time-reuse group T2 and receiving the pilot signal at antennas 20 in one or more other time-reuse groups (e.g., either T1, T3, or both T1 and T3) (Block 1120). The calibration controller also, during a third time interval, transmits a pilot signal from at least those antennas 20 in a third time-reuse group T3 and receiving the pilot signal at antennas 20 in one or more other time-reuse groups (e.g., either T1, T2, or both T1 and T2) (Block 1130).

Having transmitted these pilot signals, the calibration controller then calculates RF-chain calibration factors $\rho(f)$ for each of one or more antennas 20 in the system 100 based on the received pilot signals (Block 1140). The calibration controller uses these calibration factors $\rho(f)$ in joint processing of the signals, e.g., the downlink data signals, transmitted from the multiple antennas 20 in the system 100 (Block 1150).

Those skilled in the art will appreciate that the calibration controller may include various "circuits," whether analog, digital, or some combination of both. These circuits may include one or more processors configured with software and/or firmware (e.g., stored in memory) that, when executed by the one or more processors, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Figure 12:
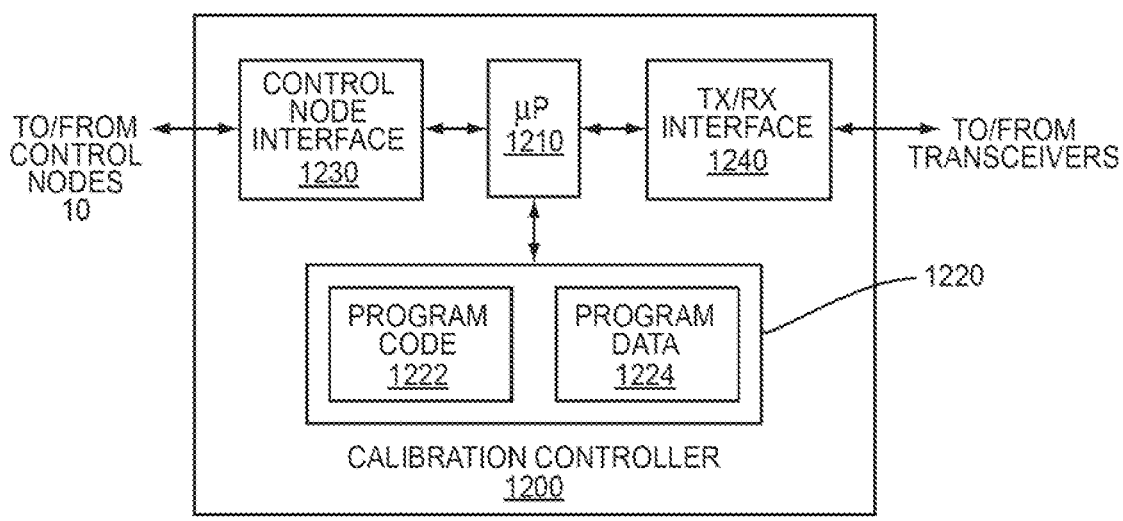
FIG. 12 is a block diagram of a calibration controller in a multi-antenna wireless communication system according to one embodiment of the present invention.

FIG. 12, for example, illustrates a calibration controller 1200 according to one embodiment. In FIG. 12, the calibration controller includes one or more processors 1210 and a memory 1220. The memory 1220 stores program code 1222 and program data 1224, which may be for example the code 1222 and data 1224 of a software program configured to calibrate the transmit-receive RF chains of antennas 20 in the system 100. When this code 1222 is executed by the one or more processors 1210, perhaps using related data 1224, the one or more processors 1210 perform as described above.

If the calibration controller 1200 is implemented in a node of the system 100 other than the central control node 10 (e.g., in one of the antennas 20), the controller 1200 may have a control node interface 1230 that communicatively couples the controller 1200 to the central control node 10. Regardless, the controller 1200 includes a TX/RX interface 1240 that communicatively couples the controller 1200 to the transmit-receive RF chains of the antennas 20. FIG. 12, of course, merely represents a non-limiting example of the calibration controller 1200.

Indeed, all of the foregoing description and the accompanying drawings represent non-limiting examples of the methods and system taught herein. As such, the present invention is not limited by the foregoing description and accompanying drawings. Instead, the present invention is limited only by the following claims and their legal equivalents.

What is claimed is:

1. A method of calibrating system frequency responses for joint antenna processing in a multi-antenna wireless communication system that comprises three or more time-reuse groups, each time-reuse group including two or more antennas that are each connected to a corresponding transmit-receive RF chain, the method comprising:

during a first time interval, transmitting a pilot signal from at least those antennas in a first time-reuse group, and receiving the pilot signals at antennas in one or more other time-reuse groups, wherein, during the first time interval, transmitting a pilot signal from at least those antennas belonging to a first time-reuse group comprises using a different transmit frequency, different channelization code, or both, for each of two or more subsets of the antennas belonging to the first time-reuse group;

during a second time interval, transmitting a pilot signal from at least those antennas in a second time-reuse group, and receiving the pilot signals at antennas in one or more other time-reuse groups, wherein during the second time interval, transmitting a pilot signal from at least those antennas belonging to a second time-reuse group comprises using a different transmit frequency, different channelization code, or both, for each of two or more subsets of the antennas belonging to the second time-reuse group;

during a third time interval, transmitting a pilot signal from at least those antennas in a third time-reuse group, and receiving the pilot signals at antennas in one or more other time-reuse groups, wherein during the third time interval, transmitting a pilot signal from at least those antennas belonging to a third time-reuse group comprises using a different transmit frequency, different channelization code, or both, for each of two or more subsets of the antennas belonging to the third time-reuse group; and calculating an RF-chain calibration factor for each of one or more of the antennas, based on the received pilot signals, each calibration factor accounting for a frequency response difference between the RF chain of the corresponding antenna and the RF chain of another one of the antennas.

2. The method of claim 1, wherein each of the transmissions comprises a transmission at two or more distinct frequencies, such that the transmissions from the two or more subsets of each group are interleaved in frequency.

3. A self-calibrating multi-antenna wireless communication system, comprising first, second, and third time-reuse groups of antennas, each group including two or more antennas configured so that each antenna is connected to a corresponding transceiver that comprises a transmit-receive RF chain, and a calibration controller operatively connected to each transceiver and configured to:

during a first time interval, transmit a pilot signal from at least those antennas in the first time-reuse group, so that the pilot signals are received at antennas in one or more other time-reuse groups wherein the calibration controller is configured to, during the first time interval, transmit a pilot signal from at least those antennas belonging to a first time-reuse group by using a different transmit frequency, different channelization code, or both, for each of two or more subsets of the antennas belonging to the first time-reuse group;

during a second time interval, transmitting a pilot signal from at least those antennas in the second time-reuse group, so that the pilot signals are received at antennas in one or more other time-reuse groups wherein the calibration controller is configured to, during the second time interval, transmit a pilot signal from at least those antennas belonging to a second time-reuse group by using a different transmit frequency, different channelization code, or both, for each of two or more subsets of the antennas belonging to the second time-reuse group;

during a third time interval, transmitting a pilot signal from at least those antennas in the third time-reuse group, so that the pilot signals are received at antennas in one or more other time-reuse groups wherein the calibration controller is configured to, during the third time interval, transmit a pilot signal from at least those antennas belonging to a third time-reuse group by using a different transmit frequency, different channelization code, or both, for each of two or more subsets of the antennas belonging to the third time-reuse group; and calculate an RF-chain calibration factor for each of one or more of the antennas, based on the received pilot signals, each calibration factor accounting for a frequency response difference between the RF chain of the corresponding antenna and the RF chain of another one of the antennas.

4. The wireless communication system of claim 3, wherein each of the transmissions comprises a transmission at two or more distinct frequencies, such that the transmissions from the two or more subsets of each group are interleaved in frequency.

5. A method of calibrating system frequency responses for joint antenna processing in a multi-antenna wireless communication system that comprises three or more time-reuse groups, each time-reuse group including two or more antennas that are each connected to a corresponding transmit-receive RF chain, the method comprising:

during a first time interval, transmitting a pilot signal from at least those antennas in a first time-reuse group, and receiving the pilot signals at antennas in one or more other time-reuse groups;

during a second time interval, transmitting a pilot signal from at least those antennas in a second time-reuse group, and receiving the pilot signals at antennas in one or more other time-reuse groups;

during a third time interval, transmitting a pilot signal from at least those antennas in a third time-reuse group, and receiving the pilot signals at antennas in one or more other time-reuse groups; and calculating an RF-chain calibration factor for each of one or more of the antennas, based on the received pilot signals, each calibration factor accounting for a frequency response difference between the RF chain of the corresponding antenna and the RF chain of another one of the antennas, wherein each time-reuse group includes antennas that are geographically dispersed.

6. A self-calibrating multi-antenna wireless communication system, comprising first, second, and third time-reuse groups of antennas, each group including two or more antennas configured so that each antenna is connected to a corresponding transceiver that comprises a transmit-receive RF chain, and a calibration controller operatively connected to each transceiver and configured to:

during a first time interval, transmit a pilot signal from at least those antennas in the first time-reuse group, so that the pilot signals are received at antennas in one or more other time-reuse groups;

during a second time interval, transmitting a pilot signal from at least those antennas in the second time-reuse group, so that the pilot signals are received at antennas in one or more other time-reuse groups;

during a third time interval, transmitting a pilot signal from at least those antennas in the third time-reuse group, so that the pilot signals are received at antennas in one or more other time-reuse groups; and calculate an RF-chain calibration factor for each of one or more of the antennas, based on the received pilot signals, each calibration factor accounting for a frequency response difference between the RF chain of the corresponding antenna and the RF chain of another one of the antennas, wherein each time-reuse group includes antennas that are geographically dispersed.

* * * * *

UNITED STATES PATENT AND TRADEMARK OFFICE
CERTIFICATE OF CORRECTION

PATENT NO. : 8,271,042 B2
APPLICATION NO. : 12/764189
DATED : September 18, 2012
INVENTOR(S) : Guey It is certified that error appears in the above-identified patent and that said Letters Patent is hereby corrected as shown below:

In Column 7, Line 9, delete "$H_{12}(f)H_{21}(f)$" and insert -- $H_{12}(f) = H_{21}(f)$ --, therefor.

In Column 7, Line 28, in Equation (8), delete "$= \frac{H_{Tx1}(f)H^*_{Rx1}(f)}{H^*_{Rx2}(f)H^*_{Rx1}(f)}$" and insert -- $= \frac{H_{Tx1}(f)H^*_{Rx1}(f)}{H_{Tx2}(f)H^*_{Rx2}(f)}$ --, therefor.

In Column 9, Line 22, delete "one," and insert -- one --, therefor.

Signed and Sealed this
Twenty-sixth Day of February, 2013

Teresa Stanek Rea
*Acting Director of the United States Patent and Trademark Office*